United States Patent [19]

Gisbourne et al.

[11] Patent Number: 4,588,632
[45] Date of Patent: May 13, 1986

[54] INDUSTRIAL FABRICS

[75] Inventors: Bryan J. Gisbourne; Paul F. Myerscough, both of Blackburn, England

[73] Assignee: Scapa-Porritt Limited, Lancashire, England

[21] Appl. No.: 660,220

[22] Filed: Oct. 12, 1984

[30] Foreign Application Priority Data

Oct. 19, 1983 [GB] United Kingdom ............... 8328014

[51] Int. Cl.⁴ .......................... B32B 5/32; B32B 7/00; D03D 23/00
[52] U.S. Cl. ............................... 428/212; 139/383 R; 139/383 A; 139/425 A; 427/243; 427/244; 427/373; 428/222; 428/245; 428/289; 428/304.4
[58] Field of Search ............... 428/247, 159, 212, 222, 428/245, 289, 304.4, 306.6, 308.4, 315.5, 315.7; 139/383 R, 383 A, 425 A; 427/243, 244, 373

[56] References Cited

U.S. PATENT DOCUMENTS

| | | | |
|---|---|---|---|
| 3,007,205 | 11/1961 | House | 428/159 |
| 4,175,154 | 11/1979 | Faust et al. | 428/312.6 |
| 4,175,155 | 11/1979 | Biranowski et al. | 428/307.3 |
| 4,224,372 | 9/1980 | Romanski | 428/257 |
| 4,233,356 | 11/1980 | Jacobs | 428/247 |
| 4,341,832 | 7/1982 | Barnett et al. | 428/308.4 |
| 4,357,386 | 11/1982 | Luciano et al. | 139/383 A |
| 4,499,139 | 2/1985 | Schortmann | 428/245 |
| 4,552,620 | 11/1985 | Adams | 428/315.5 |

Primary Examiner—William J. Van Balen
Attorney, Agent, or Firm—Fleit, Jacobson, Cohn & Price

[57] ABSTRACT

An industrial fabric, and particularly a papermakers dryer fabric, is proposed wherein the permeability thereof is reduced by the inclusion of a continuous layer of an elastomeric open-cell foam therein which extends to and is contiguous with at least one surface of the base structure, the base structure comprising a link belt or a woven or knitted fabric.

23 Claims, 6 Drawing Figures

INDUSTRIAL FABRICS

The invention concerns industrial fabrics and has more particular, though not exclusive, reference to papermachine dryer fabrics which comprise a multiplicity of helical coils arranged in interdigitated disposition.

Contamination of conventional papermakers fabrics by debris arising during the course of the paper making process gives rise to a need for sophisticated and expensive cleaning methods and equipment to be used if the service life of the fabric is to be maximised, contaminated fabrics often being removed from the paper machine notwithstanding that such fabrics have sufficient strength for continued use. The contaminant may comprise debris which collects and becomes compacted on the surface of the fabric, eventually flaking off to cause damage to the paper sheet, the problem of surface contamination being particularly acute when the papermaking furnish contains a high proportion of recycled fibres, since such fibres inevitably contain residues of coatings, binders, adhesives, fillers and printing materials from their previous usage.

Other papermaking furnishes which are pitchy or resinous also give rise to the incidence of surface contamination.

The fabric may also become contaminated by debris which becomes trapped in the interstices of the fabric, such debris largely being airborne debris from ancillary parts of the papermaking machine, and which, in time, adversely affects the permeability characteristics of the fabric.

With the progressive introduction of monofilament yarns the problem of contamination has reduced somewhat, since the debris is less likely to adhere to the smooth clean surfaces of the monofilaments than was the case with multifilament yarns, but the problem does nevertheless remain, albeit to a lesser extent.

The widespread adoption of dryer fabrics for use in the papermaking industry and which comprise a multiplicity of helical coils of synthetic monofilament material arranged in interdigitated side-by-side disposition has further reduced the problem of contamination, in view of the relative absence of surface yarn cross-over by which debris can be picked from the paper sheet under conditions of localised high pressure, and in view also of the fact that any such debris as does become detached from the paper sheet can pass freely into the interior of the coil, from whence it can be removed relatively easily by, say, air or water under pressure.

However, it often proves necessary, in practice, to reduce the permeability of the link fabrics by introducing filler materials into the coils, the presence of such filler materials detracting from the inherent resistance of the fabric to contamination.

Thus, it is proposed in United Kingdom Patent Application No. 8028861 to control permeability by the introduction of a strip or strips of a tape-like material, polyester monofilament or flat yarns into some or all of the coils, whilst U.S. Pat. No. 4,381,612 suggests the inclusion of filler strands of such as nylon or polypropylene which are subsequently subjected to heat treatment so as to effect expansion thereof within the coil.

Mention is made in Swiss Patent specification No. 610273 of the possibility of filling in the space between the limbs of each coil with foam material to control the free through-flow area, but the specification is silent as to the precise form taken by the foam in the context of the fabric as a whole and as to how the control is achieved in practice. It is seemingly the case, however, that the foam is provided within the inner transverse dimension of the individual coils and between the opposing bights of the two helical coils arranged at the respective sides of and with which the particular coil to which the foam is applied are interengaged.

Thus, despite their wide acceptance, spiral fabrics do nevertheless, give rise to difficulty in at least two regards, namely the question of contamination and controlled permeability.

It is an object of the present invention to provide an industrial fabric, whether a link fabric comprising a multiplicity of helical coils arranged in interdigitated side-by-side disposition or a more conventional woven fabric, and particularly, though not exclusively, a papermakers fabric, which presents advantages in relation both to contamination resistance and to permeability.

According to the present invention there is proposed a method of reducing the permeability of an industrial fabric comprising the steps of introducing liquid foam material or foam forming materials into the fabric, and setting or curing of such material or materials, so as to form a continuous layer of flexible open cell elastomeric foam within the fabric, one face, at least, of the resultant foam being arranged to be contiguous or substantially contiguous with a corresponding surface of the fabric.

The invention also includes an industrial fabric having a continuous layer of flexible, open cell elastomeric foam therein, the said layer having one face, at least, thereof contiguous or substantially contiguous with a corresponding surface of the fabric.

In producing a foam filled link belt in accordance with the invention it is proposed to create a mechanical foam by introducing a liquid resin and compressed air into a mixing head and to blend such resin and air by means of a rotor to provide an elastomeric foam of requisite bubble size, the resultant foam being spread onto one or both surfaces of the fabric, as desired. The foam passes into the fabric, be it a link belt or a conventional woven or knitted structure, and excess foam is removed by moving a doctor blade across the surface of the fabric, the setting of the blade in relation to the surface involved being such as to give the requisite contiguous relationship between the face of the foam and the adjacent surface of the fabric.

In the case of link fabrics, it has been found that the resin bonds to the monofilaments and provides a continuous layer which extends between and across adjacent coils, the foam thus providing a uniformity of permeability not attainable by the mere insertion of fillers into the individual coils.

Moreover, by arranging that the face of the foam and the corresponding surface of the fabric are contiguous or substantially contiguous, the creation of depressions in the surface of the foam filled fabric and in which debris can lodge are avoided, and thus contamination is minimised. Furthermore, the pore size of the foam layer, advantageously being within the range of between 0.05 mm to 0.50 mm, militates against the accumulation of debris.

As the density of the foam, and hence the pore size thereof, can be varied at will, not only can pore size be selected having regard to the average size of papermaking contaminants, and particularly fibrous debris, but so too can a pore size be selected which is appropriate to the permeability characteristic required of the foam filled fabric.

The continuity of the surface does of itself minimise creation of debris at the fabric/paper interface, but any such debris as does exist will lie on such surface and be easily removed by brushing or washing.

Whilst it is preferred that the foam be applied to the surface of the fabric and be introduced into the fabric by the combined action of gravity and the doctor blade, it may be preferred, in some instances, to inject foam into the space within the coils, such foam flowing between such spaces to dislodge air present within the link fabric.

The invention will now be described further, by way of example only, with reference to the accompanying diagrammatic drawings in which.

Figure 1:
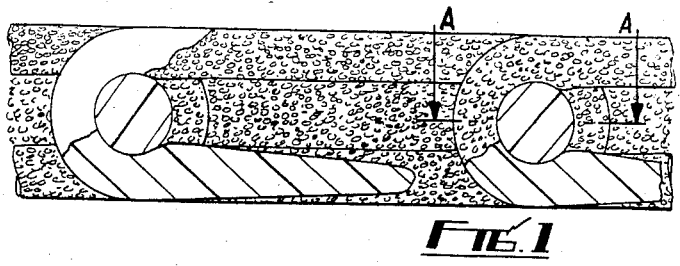
FIG. 1 is a vertical section through a link belt embodying the invention taken in the longitudinal direction of such belt on line B—B of FIG. 2.
Figure 2:
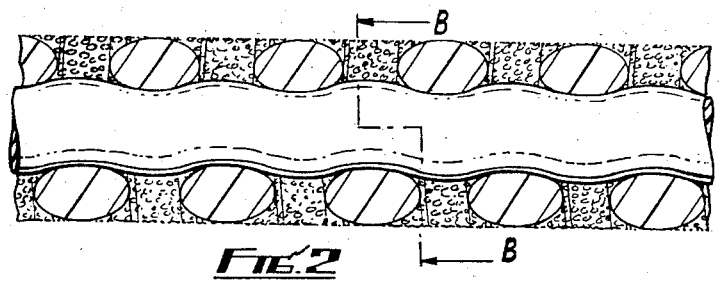
FIG. 2 is a section on line A—A of FIG. 1.
Figure 3:
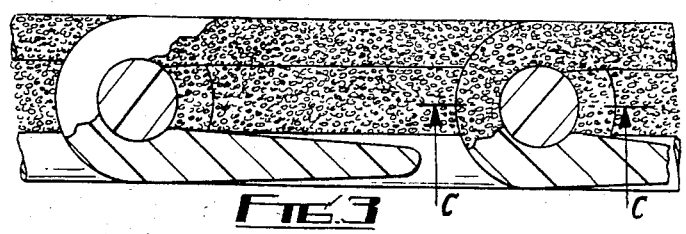
FIG. 3 shows an alternative embodiment to that shown in FIG. 1 and is a section taken on line D—D of FIG. 4.
Figure 4:
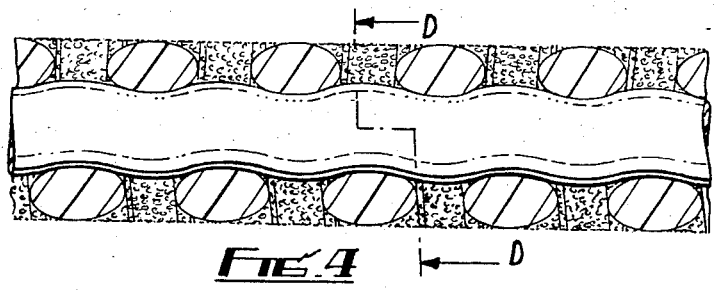
FIG. 4 is a section on line C—C of FIG. 3.

Typical foam filled link fabrics are shown in FIGS. 1 to 4, FIGS. 1 and 2 showing an arrangement wherein the contiguous relationship between the surface of the link belt and the corresponding surface of the foam exists at each face of the fabric, and FIGS. 3 and 4 illustrating an arrangement wherein such relationship exists at only once face of the fabric.

In the case of the embodiment of FIGS. 1 and 2, foam may be applied through each surface of the link fabric and excess material removed by means of a respective doctor blade at each such surface, although it is preferred to apply foam to one surface only in an amount sufficient to penetrate the full thickness of the fabric and to remove excess from that one surface, the requisite contiguous relationship between the foam and the opposite surface of the fabric resulting from contact of the fabric with the surface whereby the same is supported.

Whilst it is preferred that the foam extend throughout the full thickness of the link belt, as shown in FIGS. 1 and 2, contaminant resistance and permeability characteristics of adequate proportions are thought attainable by providing the contiguous or substantially contiguous relationship between the foam and fabric surfaces at the paper contacting side only of the structure, foam being applied to and excess removed from one surface only of the fabric, to give the arrangement shown in FIGS. 3 and 4, the amount of applied foam being sufficient to extend through a predetermined thickness only of the fabric.

Figure 5:
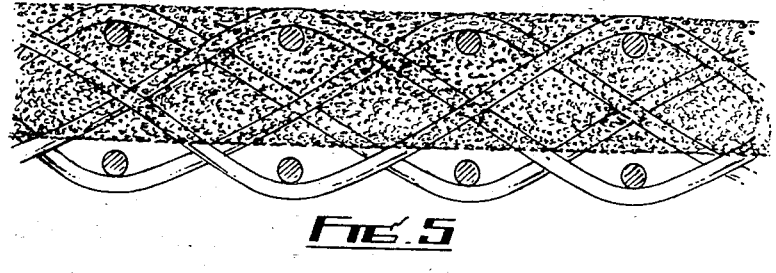
FIG. 5 is a vertical section through a woven fabric embodying the invention.

A typical woven fabric embodying the invention is shown in FIG. 5, the weave structure comprising a broken 4-end warp satin over two layers and the foam extending from the front face of the fabric to a position spaced from the opposite face thereof. Foam is applied to one surface of the woven fabric and excess is removed by means of a doctor blade as in the case of the link fabric. If desired, the foam may be provided throughout the full thickness of the fabric.

A typical foam for use in the context of the invention comprises an acrylic dispersion, or any other suitable material, which is foamed by the introduction of air into the compounded blend by mechanical action. Additives, for example thickeners and surfactants, are dispersed in the polymer mix prior to coating, the relative quantities of such additives being selected so as to give a foam mix having properties appropriate to the ready application of the mix to the substrate and to the required characteristics of the foam filling in the substrate.

The air delivery rate and blending action are adjusted during foam generation so that a foam of the required density is obtained.

An anionic plasticizer-free aqueous dispersion of a thermally crosslinkable copolymer based on acrylates and acrylonitrile, for example Acronal 330D (B.A.S.F. UK Ltd), has been found suitable for use in the context of the invention.

Latelcoll D (B.A.S.F. UK Ltd) is used to increase the viscosity of the mix on addition of ammonium stearate. Ammonia may be used to modify the pH and resultant viscosity of the mix. Surfactants such as sodium sulphur succinamate and ammonium stearate are used to impart stability, modify the pH and refine the wet foam.

The invention is primarily concerned with the production of fabrics having permeabilities of up to 200 cfm (3200 m$^3$), although filled fabrics of woven or spiral construction having permeabilities of up to 600 cfm (9600 cm$^3$) may be produced by the method of the invention.

Open cell foams of application in the context of the invention have a bubble diameter lying within the range of about 0.05 to 0.50 mm., the range of cell sizes present in a particular foam when set being determined by:

(i) base material and additives used;
(ii) foam density; and
(iii) nature of the substrate.

A lower density foam contains an average greater diameter bubble size than a higher density foam, and a standard mix of foam material foamed to different densities and applied to the same cloth will give a resultant fabric permeability which varies according to the average bubble size in the void regions of the fabric.

The following table shows the variation in permeability with variation of average bubble size of a spiral fabric (having an initial permeability of 950 cfm or 15000 m$^3$) and comprising a plurality of interdigitated coils of polyester monofilament of 0.55 mm. diameter and having internal dimensions of 5.04×1.09 mm. after heat setting of the fabric, the coils being joined by hinge wires:

| Average Bubble Size | Permeability | | % reduction |
| (mm) | cfm | m3 | in permeability |
| --- | --- | --- | --- |
| 0.078 | 72 | 1,150 | 92 |
| 0.20 | 99 | 1,580 | 89 |
| 0.25 | 126 | 2,020 | 87 |
| 0.32 | 191 | 3,060 | 80 | cfm—cubic ft per square foot per min at ½" water gauge differential pressure.

m3—cubic meters per square meter per hour at 10 mm water gauge.

Substrates of different structure may be coated with foams of different average bubble size (or density) in order to achieve the same resultant cloth permeability, as is illustrated by the following table:

| Nature | Average bubble size (mm) | Original Permeability cfm | Original Permeability m3 | Resultant Perm. cfm | Resultant Perm. m3 |
|---|---|---|---|---|---|
| Spiral | 0.078 | 950 | 15,000 | 72 | 1,150 |
| Woven | 0.172 | 850 | 14,000 | 72 | 1,150 |

The structure of the spiral fabric is as aforesaid, whilst the woven fabric comprises a broken 4-end warp satin woven from monofilament warp of 0.40 mm diameter and monofilament weft of 0.50 mm diameter with between 236 and 256 ends per 100 cms and between 118 and 142 picks per 10 cms in the finished cloth.

Figure 6:
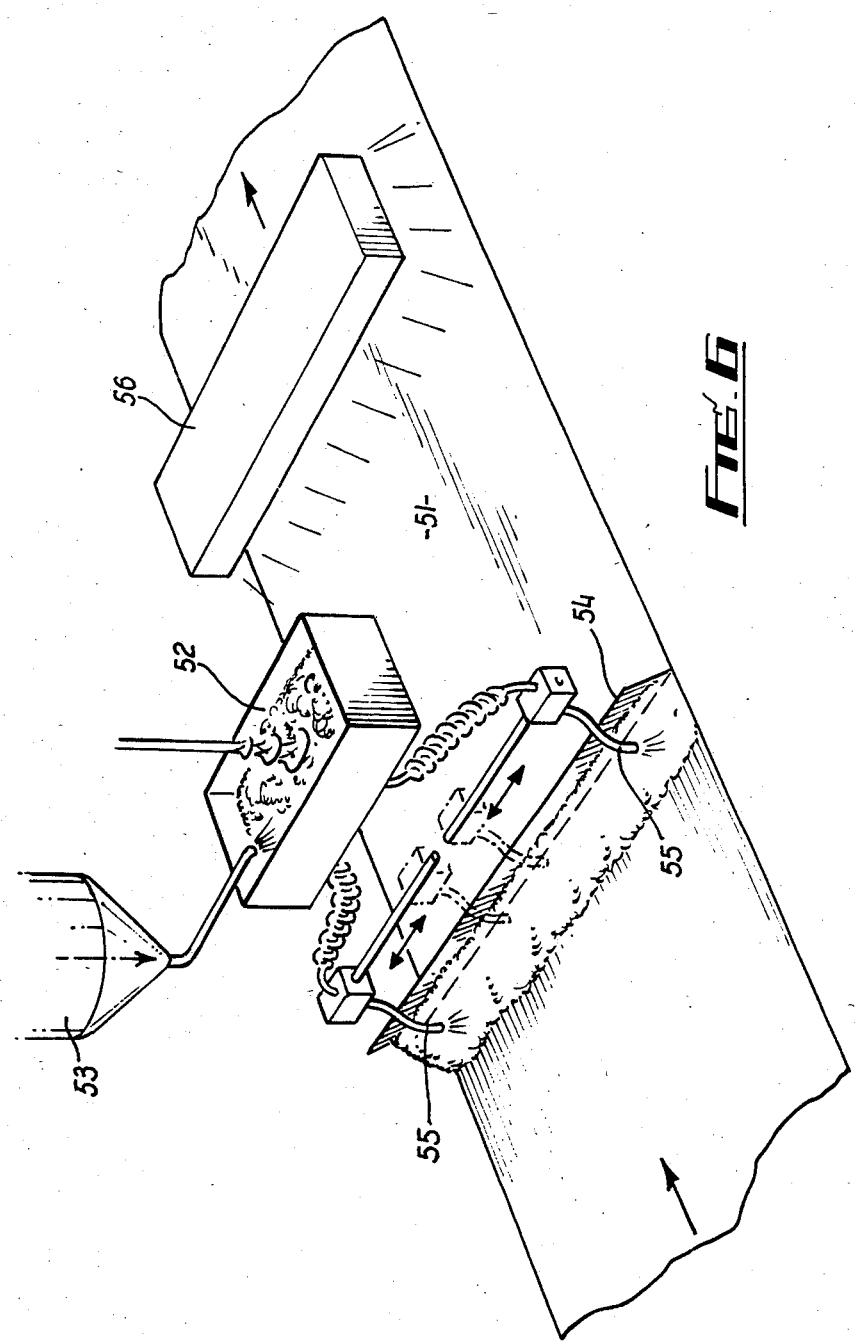
FIG. 6 is a perspective view of an apparatus for use in practising the invention.

The method of the invention is illustrated schematically in FIG. 6, and involves the support of the fabric 51 which is to be filled with foam in endless form on spaced carrier rolls (not shown) and the application of the foam mix, as prepared in a foaming unit 52 from ingredients delivered thereto directly or from a resin container 53, to the upper surface of the fabric immediately in advance of a doctor blade 54 by delivery nozzles 55, each of which is reciprocable between the middle of the fabric to a respective lateral edge thereof.

Delivery of the mix through the nozzles 55 builds up a quantity of foam mix against the doctor blade 54 at the upstream side thereof, and such mix passes into the fabric by the combined effects of gravity and of the doctor blade.

Subsequent to the application of the foam mix, the surface of the fabric being clear of foam material by virtue of the action of the doctor blade, such mix is subjected to heat from an infra-red heater 56 beneath which the fabric is passed.

Multiple passes of the fabric beneath the doctor blade may be preferred in some instances to ensure complete filling of the voids within the fabric, as too may the provision of a stripper blade (not shown) at the underside of the fabric for the removal of any excess foam material which passes through the fabric, the mix being subjected to heat subsequent to application of the requisite amount of foam mix, whether by a single or by multiple passes of the fabric under the blade.

Whilst it is preferred to use a mechanical foam, it may be possible in some instances to use a chemical foam, the purpose of the foam being simply to provide a sensibly continuous surface at the paper contacting side of the fabric which will deter the accumulation of contaminants and to provide a requisite level of permeability, the foam contributing nothing to the strength of the fabric and itself being protected against mechanical damage by the monofilament of the coils and hinge wires to which the foam may or may not be bonded.

Similar advantages are thought likely to arise from filling industrial fabrics of knitted construction in like manner to the link belts or woven fabric shown in the drawings.

It is to be observed that the invention herein set forth does make possible the production of structures wherein the permeability thereof varies throughout the width of the fabric simply by controlling the amount of foam applied at each location widthwise of the fabric, fabrics of such differential permeability being of practical significance in some applications. Thus, foam may be applied to the edge regions only of the fabric. Differential permeability can be achieved by coating the yarns in selected regions of the fabric, by means of resin or other coating material, so as to reduce the aperture size in such regions, and applying foam uniformly across the full width of the fabric.

The invention is of primary application in the context of papermakers fabrics, and especially dryer fabrics, but is not limited to use in such context.

We claim:

1. A method of reducing the permeability of a paper machine dryer fabric in whole or in part comprising the steps of introducing liquid foam or foam forming material into the fabric, and effecting setting or curing of such material, so as to form a continuous layer of flexible open cell elastomeric foam within the fabric, the foam existing wholly within the fabric and one face, at least, thereof being arranged to be contiguous or substantially contiguous with a corresponding surface of the fabric.

2. The method as claimed in claim 1, wherein a pre-prepared liquid foam material is mechanically introduced into the fabric through a surface thereof.

3. The method as claimed in claim 2, wherein excess liquid foam material is removed from the surface of the fabric and the residual material within the fabric is subsequently set.

4. The method as claimed in claim 2, wherein excess foam is removed from the surface of the fabric after setting.

5. The method as claimed in claim 2, wherein a pre-prepared liquid foam material is applied to each surface of the fabric.

6. The method as claimed in claim 1, wherein the liquid foam or foam forming material is introduced into the fabric throughout the full lateral extent thereof.

7. The method as claimed in claim 6, wherein the liquid foam or foam forming material is introduced into the fabric uniformly throughout the full lateral extent thereof.

8. A papermakers dryer fabric having a continuous layer of flexible, open cell elastomeric foam therein, the layer existing wholly within the fabric and having one face, at least, thereof contiguous or substantially contiguous with a surface of the fabric.

9. A fabric as claimed in claim 8, wherein the continuous layer of elastomeric foam extends to both surfaces of the fabric and is contiguous or substantially contiguous with the surface of the fabric at each face thereof.

10. A fabric as claimed in claim 8, wherein the elastomeric foam extends throughout the full lateral extent of the fabric.

11. A fabric as claimed in claim 8, wherein the elastomeric foam is of substantially constant thickness throughout the full lateral extent thereof.

12. A fabric as claimed in claim 8, wherein the elastomeric foam is of reducing permeability towards the longitudinal edges of the fabric.

13. A fabric as claimed in claim 8, wherein the edge regions of the fabric are coated prior to the introduction of foam or foam forming materials, thereby to reduce the apertures in the fabric in such edge regions.

14. A fabric as claimed in claim 8, wherein the foam is a mechanical foam.

15. A fabric as claimed in claim 14, wherein the mechanical foam comprises an acrylic dispersion.

16. A fabric as claimed in claim 8, wherein the bubble diameter in the foam lies in the range of 0.05 to 0.50 mm.

17. A link belt fabric comprising a multiplicity of helical coils arranged in interdigitated side-by-side disposition and hinge pins hingedly connecting adjacent coils, characterised by a continuous layer of open cell elastomeric foam disposed within the fabric, the said layer extending into substantially contiguous relationship with the surface of the fabric at one face at least thereof.

18. A papermakers dryer fabric comprising an assembly of helical coils joined together in interdigitated side-by-side relationship and further including a layer of open-cell elastomeric foam material disposed wholly within the fabric, the said layer extending into substantially contiguous relationship with the surface of the fabric at one face, at least, thereof.

19. A papermakers dryer fabric as claimed in claim 18 wherein the foam material comprises an acrylic dispersion and the bubble diameter lies in the range of from 0.05 to 0.50 mm.

20. A papermakers dryer fabric as claimed in claim 19, wherein the layer of foam material extends throughout the full lateral extent of the fabric.

21. A papermakers dryer fabric as claimed in claim 20, wherein the layer of foam is of substantially uniform permeability throughout.

22. A papermakers dryer fabric as claimed in claim 20, wherein the layer of foam material is of reducing permeability towards the longitudinal edge regions of the fabric.

23. A paper machine dryer fabric of woven construction having top and bottom surfaces thereto, including a layer of open cell elastomeric foam therein, the said layer being disposed wholly within the fabric between the top and bottom surfaces thereof and being substantially contiguous with one at least of the said surfaces, the foam having a bubble size within the range of 0.05 to 0.50 mm.

* * * * *